Jan. 18, 1944. H. OLKEN 2,339,289
RECORDER
Filed April 13, 1942 2 Sheets-Sheet 1

INVENTOR
Hyman Olken
BY
ATTORNEY

Jan. 18, 1944. H. OLKEN 2,339,289
RECORDER
Filed April 13, 1942 2 Sheets-Sheet 2

INVENTOR
Hyman Olken
BY
ATTORNEY

Patented Jan. 18, 1944

2,339,289

UNITED STATES PATENT OFFICE 2,339,289

RECORDER

Hyman Olken, Washington, D. C.

Application April 13, 1942, Serial No. 438,679

16 Claims. (Cl. 234—1.5)

(Granted under the act of March 3, 1883, as amended April 30, 1928; 370 O. G. 757)

This invention relates to an improved apparatus for measuring and recording variable conditions or quantities and more particularly to an improved apparatus for measuring and recording a desired mathematical relation between a plurality of variable conditions and/or quantities.

This invention may be considered also as relating to control systems and particularly to those systems for controlling the magnitude of either a variable condition or quantity in accordance with a departure from the desired relation between the said conditions or quantities, for example, departures from a predetermined value representing the sum or difference of such physical variables as pressure differences, fluid movement, temperature, specific gravity, velocity, etc., or the departures from a predetermined value representing the desired quotient of similar and corresponding variable conditions and/or quantities.

In certain technical fields, a number of which are set forth hereinafter by way of example, it is often desirable to measure and permanently record changes in the magnitude of certain physical variables such as temperature, pressure, rate of flow, etc., and also to obtain a permanent indication of variations from a predetermined relation which is to be maintained between certain physical conditions and quantities.

It is an object of this invention, therefore, to provide an improved apparatus for measuring and recording the changes in magnitude of a variable and to provide an improved apparatus for measuring and recording variations from a desired relation which is to be maintained between certain conditions and quantities.

It is a further and more specific object of this invention to provide a new and improved electromagnetic means for obtaining a mechanical displacement the magnitude of which is governed by the magnitude of the condition or quantity which is to be measured and recorded, or by a determinable mathematical relation between a plurality of conditions or quantities.

It is a further object of this invention to provide a system for controlling the magnitude of a condition or quantity in accordance with changes in certain conditions or quantities or changes in their mathematical relation, by obtaining a mechanical displacement which is governed by the magnitude of said conditions and by utilizing this displacement as a means for controlling the magnitudes of said conditions or quantities.

More particular advantages and objects of this invention will become apparent as certain preferred embodiments are described in connection with the drawings accompanying this specification wherein.

Figure 1:
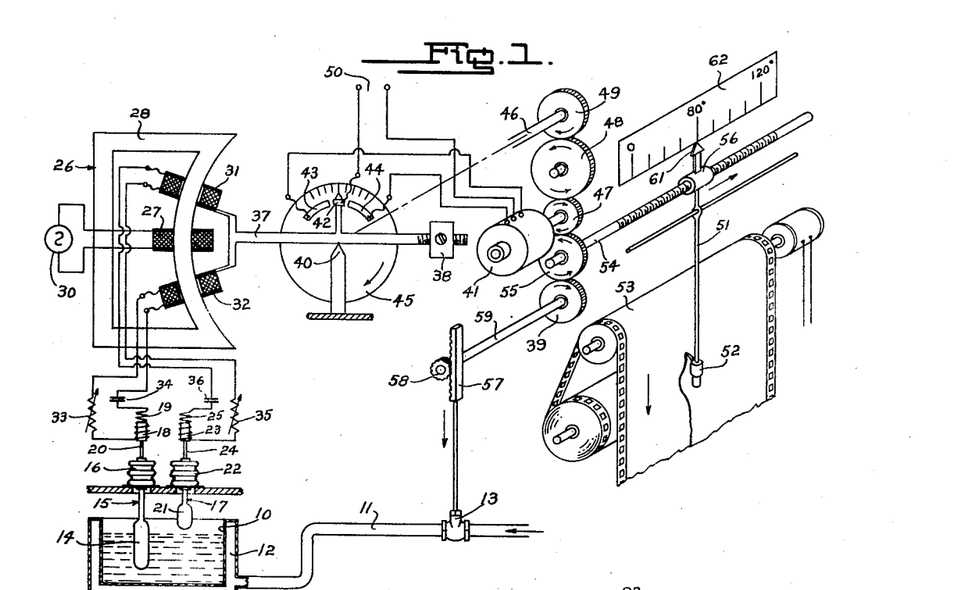
Fig. 1 is a diagrammatic illustration of an embodiment of this invention as it is utilized to indicate and record the difference between two variable conditions.

Referring now to the drawings and to Fig. 1 in particular, which illustrates this invention as applied to the field of temperature recordation and control the modification illustrated, shows a tank or vat 10 containing a liquid, the temperature of which is to be maintained at a value substantially fixed relative to the ambient temperature. This tank 10, for the purposes of illustrating this invention, may be regarded as a pasteurizing tank to which heat is supplied through a steam supply line 11 to the heat transfer structure illustrated diagrammatically at 12. The valve 13 in the steam supply line 11 controls the amount of steam admitted to the heat transfer structure 12 and in this way provides a control for the temperature of the liquid in the vat 10. The sensitive element 15 shown immersed in the liquid is sensitively responsive to changes in its temperature. This sensitive element consists specifically of a bulb like container 14 and a seamless metallic bellows 16 to which the bulb 14 is secured so that their interiors are in fluid communication. A fluid completely fills the bulb 14 and the bellows 16 so that its volume will increase or decrease with changes in temperature, causing the bellows 16 to expand or contract accordingly as the fluid pressure increases or decreases with the temperature variation. Movement of the diaphragm of the bellows 16 is transmitted to the core 18 of the variable reactance coil 19 by virtue of the fact that this core is rigidly secured to the bellows through the mechanical linkage 20. A second sensitive element 17 substantially identical in construction with the first sensitive element 15 is positioned so that the bulb 21 will be sensitively responsive to variations in the temperature of the medium surrounding the liquid within the vat 10. Movement of the diaphragm of the bellows 22 associated with this second sensitive element 17 is likewise transmitted to a core 23 through the mechanical linkage 24, causing the position of the core within the reactance coil 25 to change, producing variations in its impedance.

The device for producing a mechanical displacement, which is governed by the magnitude of the arithmetical difference between the variable conditions to which the sensitive elements 15 and 17 respond, consists specifically of a transformer 26 having a primary winding 27 which is securely fastened to a leg of its magnetic core 28 in a manner well known to the art, and which is connected to a source of alternating current voltage 30. Two independent and substantially identical secondary coils 31 and 32 are both freely mounted on the core 28 so as to be movable relative to the primary winding 27. These coils 31 and 32 are spaced at a fixed distance from each other and positioned on opposite sides of the primary winding 27. Each secondary coil is independently loaded and includes within its external circuit one of the variable reactance coils 19 and 25. As illustrated, the variable reactor 19 is connected to the terminals of the secondary coil 32 in series with a variable resistance 33 and a capacity reactance 34, whereas the variable reactance coil 25 is connected to the secondary coil 31 in series with a variable resistance 35 and a capacity reactance 36. At the initial and preferred temperature conditions the reactance coils and cores and the other impedance units are adjusted so that the total secondary currents flowing in each of these circuits will be of equal magnitude and phase angle. The two coils are held in a predetermined and a fixed position relative to each other by means of the arm 37 and are statically balanced against an adjustable counterpoise 38 on the fixed pivot 40. When the arm 37 is thus balanced and the secondary coils 31 and 32 are equally spaced from the primary coil 27 the mutual flux linking the primary coil 27 and the secondary coil 31 will be equal to the mutual flux linking the primary coil 27 and the secondary coil 32. Consequently, if the coils have an equal number of turns equal voltages will be induced in each of these secondary coils. For this condition of equilibrium the impedances of each of the external circuits connected to each of the coils are adjusted so that the current flowing in each of the secondary circuits will also be equal in magnitude and phase angle and will produce equal forces of repulsion with the primary winding 27 maintaining the beam 37 in a balanced position.

While the counterpoise 38 is preferably used to statically balance the weight of both secondaries 31 and 32 so that equal secondary currents produce equal forces of repulsion, it is apparent that the impedance of the circuits connected to each coil may be selected so that unequal currents flow in each secondary circuit to produce balance. Under these conditions the coils 31 and 32 would not be displaced equally from the primary coil 27 since the force of repulsion between coils varies inversely as the square of the distance of separation and may be expressed mathematically as follows:

$$F = \frac{CI_p X I_s}{d^2} \qquad (1)$$

wherein F is the force of repulsion, $I_p$ the primary current, $I_s$ the secondary current, $d$ the distance of separation between primary and secondary, and C as constant, assuming all turns concentrated for one turn.

Balanced conditions may therefore be produced with the balance arm 37 tilted wherein the secondary currents will bear a definite ratio relative to each other. However, it was assumed above that for the conditions of fixed temperature differential the impedances were adjusted to produce equal currents in the two secondary coils and the arm 37 was balanced in the position illustrated.

If the counterpoise is moved off the position wherein the coils are statically balanced for example to the right of the position illustrated in Fig. 1, the currents flowing in coil 32 would have to be greater than the currents flowing in coil 31. The impedances could be adjusted so as to produce balance under the condition wherein the coils are equally displaced even though the current magnitudes in each circuit connected to these secondary coils are not equal but bear a definite ratio to each other. Any departure from the ratio would result in a change in the displacement of the secondary coils.

It was assumed initially that for the predetermined condition of temperature differential the impedances were adjusted to produce equal currents in the two secondary coils 31, 32 when the arm 37 was balanced on its pivot 40 in the position illustrated in Fig. 1. Under these conditions it is further assumed that the impedance of one of the circuits connected to the secondary coil is changed, say, for example, that the temperature of the liquid in the vat 10 increases relative to the ambient temperature thus increasing the temperature differential to a value above its preset value. The core 18 will respond to the temperature increase by being moved further into the reactance coil 19 through the expansion of the bellows 16 thus increasing the impedance of this secondary circuit. The current flowing in coil 32 will be reduced as a result of the increase in the impedance and the forces of repulsion existing between coils 27 and 31 will be greater than the forces of repulsion existing between coils 27 and 32. Consequently, coil 32 will be moved into a position closer to coil 27 tilting the arm 37 in a clockwise direction. The coils 31 and 32 will thus assume a new position wherein the flux linkages between coils 27 and 32 will be greater than the flux linkages between coils 27 and 31. Unequal voltages will be induced in each of the secondary coils since the mutual flux linking each coil is changed by virtue of the change in position. It will be seen that as the torque arm 37 moves the currents change so as to bring the repulsion torques on both coils 31, 32 back toward balance. That is, the torque arm 37 will move far enough to produce equal forces of repulsion between the primary and secondary coils irrespective of the differences in the impedance of the secondary circuits, and equilibrium will be established when the distances are not equal but are related by the equation:

$$\frac{I_s-31}{I_s-32} = \frac{d^2 32}{d^2 31} \qquad (2)$$

where $I_s$—31 is the current magnitude in the secondary coil 31

$I_s$—32 is the current magnitude in the secondary coil 32

$d_{31}$ is the distance between the secondary coil 31 and the primary coil 27

$d_{32}$ is the distance between the secondary coil 32 and the primary coil 27.

This displacement between coils may be greatly amplified and permanently recorded by having the movement of the torque arm 37 control the energization of a reversible self starting motor 41. To provide for the energization of this motor in accordance with the magnitude in displacement of the balance arm 37, a contact 42 is insulated from and secured to the balance arm so as to be movable therewith to engage either of two space contacts 43 or 44 which are shown secured to an insulated disc 45 on opposite sides of the movable contact 42. The insulated disc 45 is keyed or otherwise secured to a drive shaft 46 which is mechanically geared to the motor 41 through the pinion 47, an idler 48 and main gear 49. A suitable power supply source 50 is connected to the motor 41 through the switch contacts 42—43 or 42—44 to provide for its rotation in either a forward or reverse direction.

The type of motor control system which is preferred in this invention is one in which the operation in both the forward and reverse directions may be automatically controlled and the motor quickly braked to standstill after the connection for either the forward or reverse operation is interrupted to prevent over running and hunting. A motor and its control system satisfying these requirements will be more particularly set forth and described in connection with the embodiment of this invention illustrated in Fig. 2.

We have assumed so far that upon an increase in the preset value of the temperature of the liquid above the ambient temperature the arm 37 will be tilted in a clockwise direction. As a consequence thereof the contacts 42—44 will be brought into conductive engagement completing an energizing circuit for the motor from the power supply source 50 to produce rotation of the motor in a direction indicated by the arrows. This motor drives the shaft to which the insulated disc is secured through the pinion gear 47 and the idler gear 48 to turn the insulated disc 45 also in a clockwise direction, as indicated by the arrow, thereby moving the contact 42 out of conductive engagement with the contact 44 and interrupting the energizing circuit of the motor 41. It may be desirable to have the insulated disc 45 calibrated to indicate the temperature of the liquid above the ambient temperature, in which event a zero reference mark must be provided in a position closely adjacent thereto so that the movement of the disc may be intelligently interpreted in terms of degrees change in temperature.

In order to obtain a permanently visible record of the changes in temperature differential between the liquid in the vat 10 and the surrounding medium, a pen arm 51 is provided which carries a recording pen 52 in a manner permitting this pen 52 to cooperate with a suitably graduated motor driven chart 53. By moving the pen 52 either to the left or right across the face of the chart in accordance with rotation of the motor 41 the changes in temperature differential may be indicated on this chart. This is accomplished by having the rotation of the motor 41 transmitted to the threaded shaft 54 by means of the driven gear 55 which is coupled to the shaft 54 and which meshes with the pinion gear 47 of the motor 41. The pen arm 51 is supported by an internally threaded member 56 which is adapted to receive the shaft 54 and moved longitudinally thereof in a direction depending upon the direction of rotation of the shaft. A power take-off from the motor 41 is also provided for the purpose of operating the control valve 13 in the steam supply line 11. The apparatus for effecting the operation of this valve is graphically illustrated as consisting of a rack 57 and a pinion 58, the rack 57 being secured to the operating stem of the valve to convert the rotary motion of the pinion 58 secured to the shaft 59 and driven by the gear 39 into a linear motion to operate the valve 13. It was assumed at the outset that the temperature differential had increased; therefore, rotation of the shaft 59 must be in a direction causing the rack 57 to move downwardly indicated by the arrow closing said valve 13 to reduce the amount of steam admitted to the heat transfer structure 12. It may be desirable, as illustrated, to provide the internally threaded member 56 with a pointer 61 which moves across the graduated scale 62 to indicate by its position on this scale the instantaneous values of temperature differential.

It should be apparent from the foregoing that in the event both the ambient temperature and the temperature of the liquid increase equally no change would be recorded since the impedance of both secondary circuits undergo equal change. Consequently, the repulsion forces existing between the current flow in the primary and the secondary coils will be equal. It is frequently desirable, however, to have an accurate control and a permanent record of the actual temperature of the liquid in the vat 10 rather than to have a control and record of the temperature differential. That this cannot be satisfactorily accomplished merely by using a single sensitive element emersed in the liquid and responsive to temperature variations therein will be apparent when it is considered that a single element would also necessarily respond to ambient temperature variations since the bellows 16 is not maintained exactly at the temperature of the liquid and would accordingly expand or contract slightly with changes in the ambient temperature thus producing errors in the recorded results.

Figure 2:
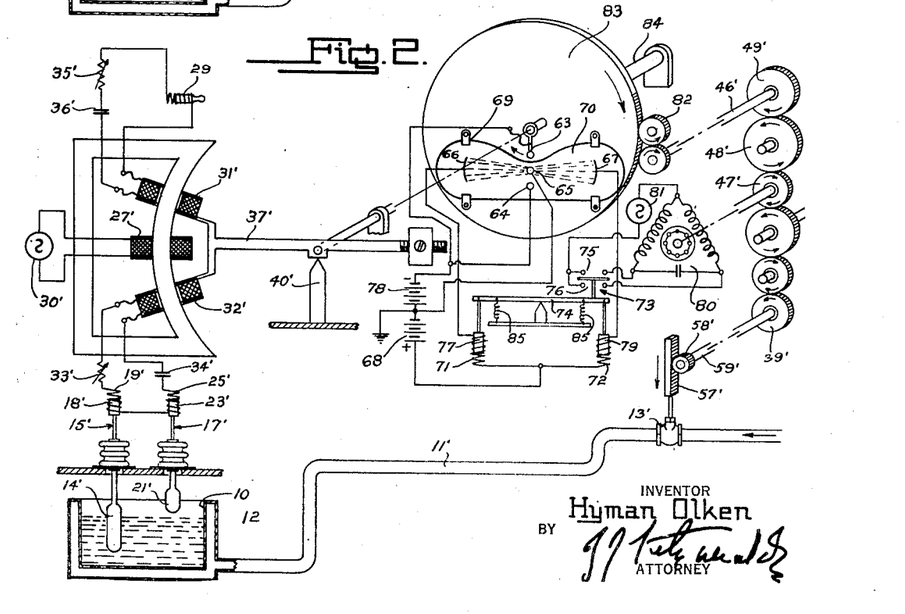
Fig. 2 is a diagrammatic illustration of a modification of the invention illustrated in Fig. 1 wherein the sum of two variable conditions is recorded.

In Fig. 2, there is shown a modified form of the apparatus illustrated in Fig. 1 wherein the variable impedance elements which respond to temperature variations are connected so that they produce an additive rather than a differential effect. That is, as the sensitive elements 15' and 17' each respond to equal incremental changes in temperature to move the cores 18' and 23' of the variable reactance coils 19' and 25' equally in the same direction, they produce equal changes in the impedance of each variable reactance coil. Both of these variable reactance coils 19' and 25' are connected to the external circuit of a single secondary coil 32' in series with the capacitive reactance 34' and the adjustable resistance 33'; therefore the total change in impedance of the secondary circuit will equal the sum of the individual changes in the impedance produced by each variable reactor. The secondary coil 31' has connected across its terminals a series circuit which includes the capacitive reactance 36', the adjustable resistance 35' and the adjustable reactor 29'. At the initial temperature conditions these impedance units are adjusted so that the currents flowing in each of the coils 31' and 32' are equal and in phase. As the ambient temperature, and/or the temperature of the liquid change, the impedance in the circuit connected to the secondary coil 32' also changes. The repulsion force existing between this secondary coil 32' and the primary coil 27' to which the power supply source 30' is connected changes in accordance with variations in the current magnitude flowing therein. This change in current magnitude will cause the balance arm 37' to be tilted because of the inequality of repulsion forces acting on opposite sides of the primary coil 27'. If, for example, the temperature of the liquid in the vat 10 were increased above the ambient temperature, the impedance connected to the coil 32' would be increased and the balance arm 37' would be tilted clockwise to a new position of equilibrium.

A movable electrode 63 is insulated and secured to the balance arm 37' so that its position relative to the fixed electrode 64 and the cathode 65 of the space discharge device 70 will be changed as the balance arm 37' tilts about its pivot 40. This space discharge device 70, the construction of which forms part of the subject matter described and claimed in my copending application, Serial No. 487,563, filed May 19, 1943, is provided for the purpose of controlling the current flow in each of the windings 71 and 72 of the different'al relay 73, thereby controlling this relay and in turn controlling the energization of the split phase motor 80. As shown, opposite ends of the coils 71 and 72 of the differential relay 73 are connected respectively to the anodes 66 and 67 of the space discharge device 70. The cathode 65 of this discharge device is connected to the grounded terminal of the power supply source 68. The high side of this source of potential 68 is connected to the common terminal of the coils 71 and 72 of the differential relay 73. The fixed electrode 64 is contained within the envelope 69 which also encloses both of the anodes 66 and 67 and cathode 65. This fixed electrode 64 together with the movable electrode 63 is connected to the negative terminal of a suitable source of electric potential 78. In the balanced or stable position of control, the movable electrode 63 assumes a position relative to cathode 65 and the fixed electrode 64, wherein the two electrodes 63 and 64 act so as to focus the electrons emitted from the cathode 65 into two equal beams directed oppositely toward the anodes 66 and 67. In this balanced position of the movable electrode 63 equal currents flow in both of the coils 71 and 72, producing an equal pull on their respective cores 77—79 and thereby maintaining the pivoted lever 74 of the relay in its balanced position. When the movable electrode is deflected, however, either to the right or the left, equal currents no longer flow in the coils 71 and 72 of the relay 73. Consequently, the pivoted lever 74 is tilted in either of two directions about its pivot to close the contact 75 or 76. Say, for example, that the movable electrode is deflected to the left in response to the clockwise tilt of the balance arm 37'; the electron emission from the cathode 65 to the anode 66 will now be deflected downwardly and part of the electron beam will move off the surface of the anode 66, thereby reducing the space current to this anode 66 and reducing also the current in the coil 71. The pivoted lever 74 of the relay 73 will be tilted clockwise so that the contacts 76 will be closed establishing an energizing circuit for the motor 80 from the power supply source 81 to produce rotation in the direction indicated by the arrow.

Rotation of this motor is transmitted through the gears 47', 48' and 49' to the shaft 46' to which the pinion gear 82 is drivingly secured. This pinion gear is in mesh with the gear peripheral edge of the disc 83 and provides a driving connection therefor for positioning this disc 83 on its shaft 84. The electron tube 70 is suitably mounted on this disc and is moved about an axis so as to bring the two electrodes 63 and 64 into a position wherein the electron emersion of the cathode 65 will again be equally divided between the anodes 66 and 67 establishing equal currents in the two coils 71 and 72 of the differential relay 73 causing the coils of this relay to be equally energized. The pivoted lever 74 will be immediately returned to the illustrated position by the springs 85 thereby interrupting the energizing circuit for the motor 80. A power take-off from the motor 80 similar to that illustrated in Fig. 1 is also provided in this modification to control the valve 13' in the steam supply line 11'.

While a capacity split phase motor 80 is shown in Fig. 2, this invention is not necessarily limited to this type of motor. In fact, a motor control system which will produce a positive braking action immediately upon its deenergization is preferred. Such a motor and control system is illustrated in the United States patent to West, No. 2,213,892.

Consider that it is desirable to maintain the liquid in vat 10 at 145° centigrade and consider further that when the impedance elements are originally adjusted for the initial balance setting of the recorder, the ambient temperature is 65° centigrade, by using the control illustrated in Fig. 1 the motor 41 could be energized to control the temperature in the vat 10 in accordance with a fixed temperature differential of 80° centigrade and to record the differences in temperature between the liquid in the vat and the temperature of the surrounding medium. By use of the control system illustrated in Fig. 2 the motor 80 would, however, be energized to control the temperature in the vat 10 so as to maintain the total of the ambient and liquid temperature at 210° centigrade and to record the total temperature of the liquid in the vat 10 plus the temperature of the surrounding medium. If the ambient temperature should suddenly increase to 70° centigrade the motor 41 would be energized to respond to the decrease in the predetermined differential recording said decrease in temperature differential and open the valve 13. Motor 80 would also be energized to record the increase in the total temperature corresponding to 215° and to close the valve 13' in the steam supply line 11'. Since the actual temperature of the liquid in the vat 10 has not changed, the total amount of steam admitted to the heat transferring structure 12 would also remain unchanged. Furthermore, the exact temperature of the liquid in the vat 10 could be easily ascertained by comparing the differences in the recorded values.

Figure 3:
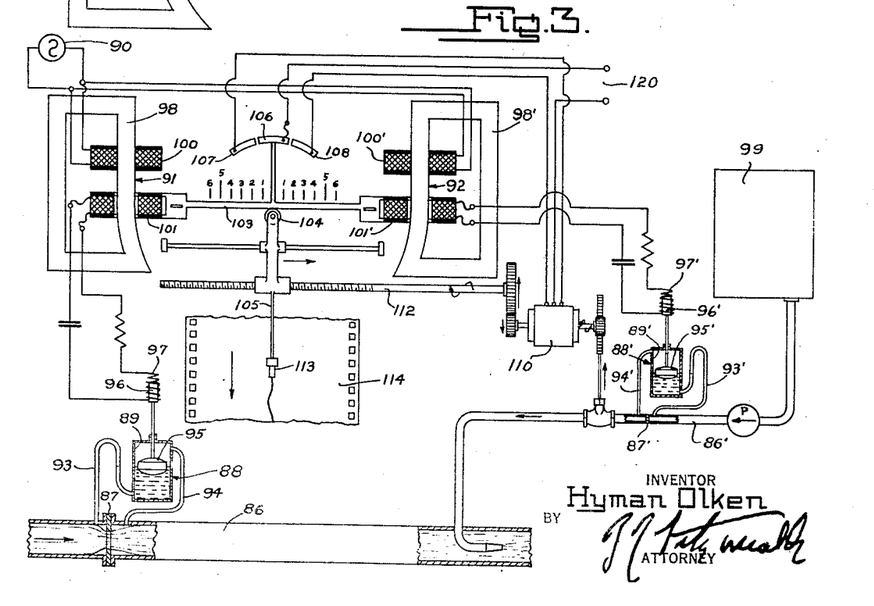
Fig. 3 is a diagrammatic illustration of a further embodiment of this invention as it is applied to a system for recording the quotient of two quantities and for controlling one of said quantities in accordance with a determinable ratio between said variable quantities.

There is shown in Fig. 3 a further modification of this invention illustrating its application to a system of control wherein it is desirable to maintain a fixed ratio between two variable quantities and to record the ratio of the said quantities. The structure illustrated in this embodiment is modified to the extent that two identical transformers, indicated at 91 and 92, are employed instead of the single transformer illustrated in Figures 1 and 2. The two primary coils 100 and 100' of the two transformers are substantially identical and are each rigidly secured to their respective magnetic cores 98 and 98' and as illustrated are connected to a common source of alternating current potential 90. The secondary coils 101 and 101' are also substantially identical and are mounted so as to be freely movable on their respective cores by being secured to the opposite ends of a pivot balance arm 103. Each of these secondary coils is connected to an external circuit which includes one of the variable reactance coils 97 or 97'. This modification as shown is applied to a system of water purification wherein it is desirable to maintain a certain ratio between the flow of chlorine in pipe 86' to the flow of water in the water main 86 to keep the percentage of chlorine in the water constant and also to continuously record the ratio of the flows.

As illustrated, the water main 86 is provided with a thin plate orifice 87 which produces a pressure differential within the water main on opposite sides of the said orifice. As is well known, this pressure differential which exists in the pipe 86 is proportional to the square of the velocity of the fluid flowing therethrough and may be used to indicate the rate of flow. In order to measure this pressure differential and to control the impedance of the secondary coil 101 of the transformer 91 in accordance with variations in this rate of flow of water in the main 86, a differential manometer 88 is provided. This differential manometer consists specifically of a manometer chamber 89 containing a liquid such as mercury. The high and low pressure sides of this chamber are connected to opposite (high and low pressure) sides of the orifice 87 by means of the pipes 93 and 94 so that level of the liquid within the chamber 89 will be maintained at a height proportional to the pressure differential within the water main 86. Any variation in pressure differential indicating the variations in flow of fluid therethrough will produce changes in the liquid level within the chamber 89. These variations in liquid level will be duplicated by movement of a float 95 which rests upon the liquid and will be transmitted to the core 96 of the reactance coil 97 causing the impedance of the external circuit connected to the terminals of the secondary winding 101 to be changed.

The core 96' of the reactance coil 97' shown connected in the external circuit of the secondary coil 101' is in a like manner secured to a float 95' of a differential manometer 88'. This float 95' duplicates variations in the level of a liquid contained within the manometer well 89' and transmits the variations in height of this liquid to a core 96' of the reactance coil 97'. The high and low pressure sides of the chamber 89' are connected by means of the pipes 93' and 94' to the opposite (high and low pressure) sides of the orifice 87' which is positioned within the chlorine supply line 86'. Consequently, the movement of the core 96' of the reactance coil 97' in response to variations in the flow of chlorine produces a change in the total impedance of the secondary circuit and this impedance will vary as a function of the flow of chlorine from the supply tank 99 into the water main 86.

For the initial condition wherein the ratio of chlorine to water is set at its preferred value, the impedance elements connected to each of the secondary coils 101 and 101' are adjusted so that the forces of repulsion existing between the primary and secondary coils 100—101 and 100'—101' are equal. The arm 103 will be balanced on the movable fulcrum 104 as a result of these equal forces of repulsion. This arm 103 is provided with a movable contact 106 which is moved, as the arm is deflected, into conductive engagement with either of the fixed contacts 107 or 108. These contacts control the energization of a reversible motor 110 from the source of electrical potential 120 to produce rotation in either a forward or reverse direction.

In order to bring the arm 103 and the two secondary circuits 101 and 101' into a balanced position and to record the departure from a fixed ratio to which they respond, the threaded shaft 112 is geared to the motor 110 so as to control the position of the movable pivot 104 and the recording pen supporting arm 105. Consider, for example, that the rate of flow of fluid in the pipe 86 increased. This would cause an increase in the pressure differential existing on opposite sides of the orifice 87 raising the liquid level and moving the core 96 further into the coil 97 thus increasing the impedance of the external circuit connected to the secondary coil 101. The force of repulsion existing between the primary and secondary coils of the transformers 91 and 92 will now be unequal because the current in the secondary coil 101 has been reduced. The balance arm 103 will be tilted in a clockwise direction about its pivot 104 as a result of the unequal moments applied thereto by the repulsion forces existing between the primary and secondary coils of the two transformers 91 and 92. As a result of the movement of the balance arm 103, contact 106 will be brought into conductive engagement with contact 108 energizing the motor 110 for rotation in the direction indicated by the arrow. As a result of the energization of the motor 110 the threaded shaft 112 will be rotated in the indicated direction to move the pivot 104 to the right to a position wherein the product of the force of repulsion existing between the primary coil 100 and the secondary coil 101 to its torque arm balances the product of the force of repulsion existing between the primary coil 100' and the secondary coil 101' multiplied by its torque arm. Since the ratio of the force of repulsion are inversely proportional to their torque arms, the movement of the pivot may be recorded by means of the pen 113 moving across the face of the chart 114 and this displacement may be calibrated to indicate the ratio of the flow of the two fluids.

It should be apparent from a consideration of the embodiments of this invention as illustrated in Figs. 1 and 3, inclusively, that the variations in the line voltage will not effect the balance secondary windings since the force of repulsion which produces the mechanical displacement between windings is equal to the difference in repulsion force existing between each primary and secondary coil. Any change in the supply voltage would naturally effect the repulsion forces in both secondary coils equally with the result that the repulsion forces are balanced out. In addition to this feature, the sensitivity of the recorder may be controlled through the selection of the supply source frequencies. That is, by using high supply frequencies, the sensitivity may be increased. The impedance of the variable reactance coils which are sensitively responsive to the condition or quantity under investigation is proportional to the supply frequencies. Therefore, for unit motion of the reactor core, the greater the frequency the greater will be the impedance change and the greater the mechanical displacement between the primary and secondary coils. This increase in sensitivity and independence of variations in supply voltage are features which render this device superior to similar prior art devices when used in a control and recording system where accuracy is a predominant factor.

Figure 4:
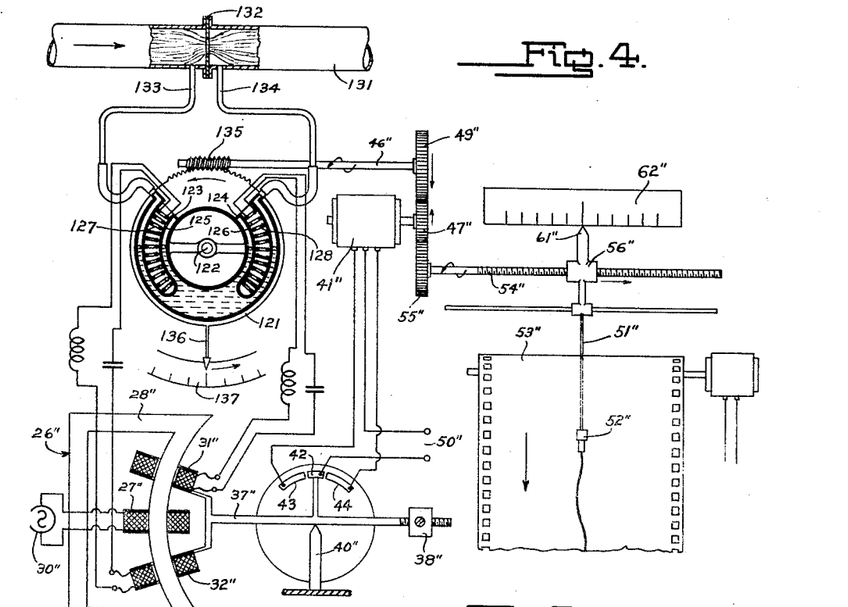
Fig. 4 is a diagrammatic view illustrating this invention as applied to a flow meter and recorder therefor.

Fig. 4 illustrates the invention as applied to a balanced ring type flow meter wherein the ring shaped tube 121 is rotatably supported on a shaft 122 at its center so as to be capable of turning freely thereon. This ring shaped U tube 121 is partially filled with a suitable electrically conductive liquid such as mercury and is divided into an upper and lower chamber by the partitioning walls 123 and 124. Each of these partitioning walls has an opening formed therein into which the arcuate shaped tubes 125 and 126 are sealed. These arcuate shaped tubes 125 and 126 are closed at the end which projects into the liquid retained in the lower portion of the hollow annulus 121 and each contains a reactance coil. That is, reactance coil 127 is securely fastened to the inside surface of tube 125, whereas the reactance coil 128 is supported within the tube 126. These reactance coils 127 and 128 are each connected to secondary coils 31'' and 32'', respectively, of a transformer unit which is similar in all respects to that illustrated and described in connection with Fig. 1. The primary 27'' of this transformer is connected to a power supply source indicated at 30'' and is securely and immovably mounted on its transformer core whereas each of the secondary coils 31'' and 32'' are mounted so as to be freely movable on the core relative to the primary coil. The pipe line 131 through which flows the particular fluid to be measured has an orifice plate 132 located therein. Fluid conductive connections 133, 134 are led off from each side of the orifice plate and connect opposite sides of the lower chamber of the hollow annular body 121 so that the liquid in the tube 121 will be subjected to the pressure differential existing in the pipe 131 on opposite sides of the orifice plate 132. When fluid is flowing through the conduit 131 and plate orifice 132 the resultant difference in pressure occurring on opposite sides of the orifice acts upon the liquid in the ring shaped U tube 121 causing this liquid to be transferred from the left hand side of the tube to the right hand side thereof. The consequence of this transfer is to cause the liquid level of the mercury to rise to a greater height around the reactance coil 128 than it does around the reactance coil 127. This ring of mercury surrounding the reactance coils acts substantially like a short circuit turn on a secondary of the transformer. The greater the height of the mercury on the coil, the greater will be the mutual flux linking the ring of mercury and the reactance coil. This increase in mutual flux causes the voltage induced in the secondary coil to be increased and produces an increase in the current flow therein. As is well known, the impedance of the primary of inductively coupled coils varies inversely with the current passing through the secondary since the secondary current tends to demagnetize or reduce the flux produced by a primary coil and hence reduces the counter-electromotive force. This action allows the current in the primary to increase until the magnetomotive force produced by the secondary coil is balanced and the existing magnetomotive force in the primary produces a sufficient flux to induce the counter-electromotive force. Considering that the flow of fluid in the pipe line 131 increases, then the mercury contained in the ring shaped U tube 121 will be forced down on the left hand side and upwardly on the right hand side. The consequence of this transfer of liquid is to cause the current flow in the secondary coil 32'' to decrease, whereas the current flowing in the secondary coil 31'' will be increased with the result that the force of repulsion existing between the primary coil 27'' and the two secondary coils will be unequal, tilting the balance arm 37'' in a clockwise direction closing the contacts 42'' and 44'' and energizing the motor 41'' from the power supply source 50'' to produce rotation in a direction indicated by the arrow. This rotation of the motor is transmitted through the gears 47'' and 49'' to the shaft 46'' which has a worm gear 135 secured thereto and meshing with the geared periphery edge of the ring shaped tube 121. The tube 121 will be rotated about the shaft 122 in a counter clockwise direction to establish equilibrium by moving the reactance coils to a position wherein they project equally into the mercury. The rotational movement of the motor 41'' is also transmitted to the threaded shaft 54'' to move the recording pen 52'' transversely of the motor driven chart 53'' to produce a visible indication of the displacement of the recording pen. The position of the pointer 136 on the graduated dial 137 will also indicate the instantaneous rate of flow of fluid in the pipe 131.

In accordance with the patent statutes, I have shown by way of illustration and not by way of limitation how certain preferred embodiments of this invention may be applied to measure and record different variable conditions or quantities, or to measure and record different relations between these variable conditions or quantities and also to control the magnitude of a variable condition or quantity in accordance with a predetermined relation between said conditions or quantities. It is understood that various changes may be made in the disclosed embodiment. For example, a single variable reactor could be connected to a single secondary and the core and coil made to move respectively in response to a different condition or quantity to record their arithematical difference. Furthermore, the members 125 and 126 forming a support for the reactance coils need not necessarily be tubular in form but may be constructed so that the coils are molded therein or wound thereon. Other similar changes in structure may be made in the apparatus disclosed and still remain within the scope of the appended claims.

The invention described herein may be manufactured and used by or for the Government of the United States of America for governmental purposes without the payment of any royalties thereon or therefor.

I claim:

1. In combination an alternating current supply circuit, a primary coil connected thereto, a pair of secondary coils fixedly displaced relative to each other and inductively coupled with said primary coil, a pair of variable impedance elements, means connecting said impedance elements respectively to said secondary coils so as to form a closed circuit therewith, means supporting said coils permitting relative movement between said primary and said secondaries providing for an increase in the coupling between said primary and one of said secondaries and a simultaneous decrease in the coupling between said primary and the other of said secondaries, means statically balancing said secondary coils whereby said coils will seek a position in which the primary will be displaced from each of the secondaries an amount dependent upon the relative current magnitudes in said secondary coils, means for establishing a preset displacement between said primary and secondary coils when the impedance of each of said variable impedance elements bear an initial predetermined relation, means responsive to a change in the magnitude of a first variable condition for changing the impedance of one of said variable impedance elements, and means responsive to a change in magnitude of a second variable condition for changing the impedance of the other of said variable impedance elements whereby a change in the initial predetermined relation of said impedance elements will produce a change in the relative displacement between the primary and secondary coils increasing the mutual flux linking the primary with one secondary and simultaneously decreasing the mutual flux linking said primary with the other of said secondaries to maintain balance in the displaced position.

2. The combination defined in claim 1 characterized further by the addition thereto of a means for producing rotation in either a forward or a reverse direction, the magnitude and direction of the rotation produced by said means being controlled by the magnitude and direction of the change in the preset displacement between said primary and secondary coils.

3. In combination an alternating current supply circuit, a primary coil connected thereto, a pair of secondary coils retained in a fixed position relative to each other and inductively coupled to said primary, separate closed circuit means connected to each of said secondary coils at least one of which contains a variable impedance element, means supporting said coils permitting relative movement between said primary and said secondaries providing simultaneously for an increase in the coupling between the primary and one secondary and a decrease in the coupling between the primary and the other secondary whereby said coils will seek an initial position in which the primary is displaced between each secondary an amount dependent upon the initial load in each secondary, and means responsive to a change in the magnitude of a variable condition for varying the impedance of at least one of the closed circuits connected to said secondary coils whereby said coils will be moved from their initial position to a displaced position wherein the mutual flux linking the primary with one of said secondary coils is increased whereas the mutual flux linking the primary with the other of said secondary coils is simultaneously decreased thereby maintaining balanced forces of repulsion between the primary and each of said secondary coils in the said displaced position.

4. The combination defined by claim 3 characterized by the addition thereto of a means for producing rotation in either a forward or a reversed direction, said rotation producing means being controlled by the magnitude and direction of the change in the initial displacement of said primary and secondary coils.

5. In combination an alternating current supply circuit, a primary coil connected thereto, a pair of secondary coils fixedly displaced relative to each other and inductively coupled with said primary coil, means forming separate closed circuits connected to each of said secondary coils, at least one of said closed circuits including at least two variable impedance elements, means supporting said coils permitting relative movement between said primary and said secondaries providing for an increase in the mutual inductance between the primary and one secondary and a simultaneous decrease in the mutual inductance between the primary and the other of said secondaries whereby said coils will seek an initial position in which the primary is displaced from the secondaries an amount dependent upon the relative current magnitude in each of said secondary coils, means responsive to a change in one variable condition for producing a change in one of said variable impedance elements, means responsive to a change in another variable condition for producing a change in the other of said variable impedance elements whereby the total impedance of said secondary coil will be dependent upon the relation between said variable conditions, means for establishing a preset displacement between said coils when said variable conditions bear a predetermined relation, rotation producing means for controlling one of said variable conditions, said rotation producing means being governed by the magnitude of the change in the preset displacement between said coils whereby said predetermined relation may be maintained substantially constant.

6. In combination an alternating current supply circuit, a pair of coils each inductively coupled with said supply circuit, separate closed circuit means connected to each of said coils, at least one of which contains a variable impedance element, means supporting each of said coils so that the coils may be moved simultaneously in opposite directions relative to their coupled portion of the alternating current supply circuit to vary the mutual inductance between each of said coupled circuits permitting the coils and their coupled portion of the supply circuit to assume an initial balanced position, means responsive to a change in the predetermined magnitude of a variable condition for changing the impedance of at least said variable impedance element whereby to cause the initial displacement of said pair of coils to change, to increase the mutual inductance of one of said coils and simultaneously decrease the mutual inductance of the other of said coils thereby maintaining balanced forces of repulsion between the coupled portions of each circuit.

7. The combination defined by claim 6 characterized by the addition thereto of rotation producing means for controlling the magnitude of said variable condition, said means being governed by the magnitude of the change in the initial displaced position of said coils.

8. In combination an alternating current supply circuit, a primary coil connected thereto, a pair of secondary coils retained in a fixed position relative to each other and inductively coupled with said primary coil, means forming separate closed circuits connected to each of said secondary coils, means supporting said coils permitting relative movement between said primary and said secondaries providing for an increase in the coupling between the primary and one secondary and a simultaneous decrease in the coupling between the primary and the other secondary whereby said coils will seek a position in which the secondaries are each displaced from the primary an amount dependent upon the relative current magnitudes in said coils, means establishing an initial displacement between said coils when the current magnitudes bear a definite relation whereby in response to a change of the current magnitude in the circuit connected to one secondary coil relative to the current magnitude in the circuit connected to the other secondary coil the initial displacement between said coils will be changed.

9. The combination defined in claim 8 characterized further by the addition thereto of a rotation producing means for controlling the current magnitude in at least one of the said circuits connected to said secondary coils, said rotation producing means being governed by the magnitude of the change in displacement of said coils from said initial position.

10. In an apparatus for continuously indicating and permanently recording changes in magnitude of at least a variable condition, the combination including an alternating current supply circuit, a transformer comprising a permeable core having a primary coil fixed thereto and connected to said supply circuit, a pair of secondary coils surrounding said core on opposite sides of said primary coil, means supporting said coils so that they are fixedly displaced relative to each other but movable in opposite directions relative to said primary, means forming a separate closed circuit for each coil, the said circuit forming means for at least one of said coils including means responsive to variations in at least one variable condition for producing variations in the impedance of said circuit, and means statically balancing said coils whereby the position of the secondary coils relative to said primary coil will be dependent upon their respective current magnitudes.

11. In combination an alternating current supply circuit, a pair of coils, each inductively coupled to at least one portion of said supply circuit so as to be inductively energized therefrom, separate closed circuit means connected to each of said coils, means supporting each of said coils so that the coils may be moved simultaneously in opposite directions relative to their respective coupled portion of the alternating supply circuit to oppositely vary the mutual inductance between each of said coupled circuits whereby said coils will seek an initial position in which each of the coils is displaced relative to their coupled portion of the supply circuit an amount dependent upon the relative current magnitudes in said coupled circuits, said supporting means including means for establishing an initial displacement between said coils and their respective coupled portion of the supply circuit when the current magnitudes in said coils bear a predetermined relation, whereby in response to a change of the current magnitude in the circuit connected to one of said coils relative to the current magnitude in the circuit connected to the other of said coils the initial displacement between the coils and their respective coupled portion will be changed.

12. The combination defined in claim 11 characterized by the addition thereto of a means for producing rotation in either a forward or reverse direction for either increasing or decreasing the ratio of the current magnitude in each of said coils, the direction and magnitude of rotation being governed by the direction and magnitude of the change in the initial displacement between said coils.

13. In a fluid flow recorder, the combination including an alternating current supply circuit, a primary coil connected thereto, a pair of secondary coils retained in a fixed position relative to each other and inductively coupled with said primary coil, means forming separate closed circuits connected to each of said secondary coils, means supporting said coils permitting relative movement between said primary providing for an increase in the coupling between the said primary and one of said secondaries and a simultaneous decrease in the coupling between said primary and the other of said secondaries, whereby said coils will seek an initial position in which the primary is displaced from the secondaries an amount dependent upon the relative current magnitudes in said secondary coils, means responsive to an increase or a decrease in the quantity of fluid flow for simultaneously and respectively increasing or decreasing the current magnitude in one of said secondary coils and for simultaneously and respectively decreasing or increasing the current magnitude in the other of said secondary coils whereby to change the relative displacement between the primary and the secondary coils causing an increase in the flux linking the primary with the secondary in which the current magnitude was initially increased and simultaneously decreasing the flux linking the primary with the secondary in which the current magnitude was initially decreased.

14. In a fluid flow recorder, the combination including an alternating current supply circuit, a pair of coils each inductively coupled with said supply circuits so as to be inductively energized therefrom, separate closed circuit means connected to each of said secondary coils, means supporting each of said coils fixedly displaced relative to each other but movable in opposite directions relative to their respective coupled portion of the supply circuit whereby to increase the mutual inductance between one of said coupled circuits and simultaneously decrease the mutual inductance between the other of said coupled circuits, said supporting means including means for permitting the said coils to assume an initial position displaced relative to their respective coupled portions wherein the forces of repulsion will be balanced, means responsive to an increase or decrease in the quantity of fluid flow for simultaneously and respectively increasing or decreasing the current magnitude in one of said coils and for simultaneously and respectively decreasing or increasing the current magnitude in the other of said secondary coils whereby to change the relative displacement between the coupled portion in said coils to increase the flux linking the coupled portion of the supply circuit with the coil in which the current magnitude was initially decreased and simultaneously decrease the flux linking the coupled portion of the supply circuit with the coil in which the current magnitude was initially increased.

15. In a device for recording the ratio of the magnitude of two variable conditions the combination including an alternating current supply circuit having two primary coils connected thereto, a pair of secondary coils each inductively coupled with its respective primary coil, a pair of variable impedance elements, circuit means connecting each impedance element to its respective coil to form a closed circuit therethrough, means supporting said secondary coils in a fixed position spaced relative to each other, said supporting means including a movable pivot positioned intermediate said secondary coils permitting said secondary coils to be moved in opposite directions relative to their respective primary coils increasing the mutual inductance between one primary and its secondary and simultaneously decreasing the mutual inductance between the other primary and its secondary, whereby said secondary coils will assume an initial position displaced relative to their respective primary coils an amount depending upon the product of the primary and the secondary currents flowing therein, means responsive to a change in the magnitude of at least one variable condition for producing a change in the impedance of one of said variable impedance elements, means responsive to a change in the magnitude of at least another of said variable conditions for effecting a change in the impedance of the other of said variable impedance elements, means balancing said secondary coils in a fixed position relative to their respective primaries when said conditions bear a predetermined ratio whereby upon a change in the magnitude of one of said conditions relative to a change in the magnitude of the other of said conditions a change in the displacement of said coils will be effected, and means governed by the magnitude of the change in the displacement of said coils for moving said pivot in a direction to again establish equal displacement therebetween.

16. In a fluid flow recorder, said recorder including a time driven chart having a recording pen movable relative thereto to record the rate of flow thereon and driving means rotatable in either a forward or reverse direction for controlling the position of said pen relative to said chart, the combination comprising an alternating current supply circuit, a primary coil connected thereto, a pair of secondary coils retained in a fixed position relative to each other and inductively coupled with said primary coil, means forming separate closed circuits connected to each of said secondary coils, means supporting said coils permitting relative movement between said primary providing for an increase in the coupling between the said primary and one of said secondaries and a simultaneous decrease in the coupling between said primary and the other of said secondaries, whereby said coils will seek an initial position in which the primary is displaced from the secondaries an amount dependent upon the relative current magnitudes in said secondary coils, means responsive to an increase or a decrease in the quantity of fluid flow for simultaneously and respectively increasing or decreasing the current magnitude in one of said secondary coils and for simultaneously and respectively decreasing or increasing the current magnitude in the other of said secondary coils whereby to change the relative displacement between the primary and the secondary coils causing an increase in the flux linking the primary with the secondary in which the current magnitude was initially increased and simultaneously decreasing the flux linking the primary with the secondary in which the current magnitude was initially decreased, and means responsive to changes in relative displacement between said primary and said secondary coils for controlling the rotation of said driving means for said pen.

HYMAN OLKEN.